3,487,154
METHOD OF LOWERING BLOOD PRESSURE
Edward D. Coen, Media, Pa., assignor to Smith Kline & French Laboratories, Philadelphia, Pa., a corporation of Pennsylvania
No Drawing. Filed Apr. 3, 1967, Ser. No. 627,624
Int. Cl. A61k 27/00
U.S. Cl. 424—321
12 Claims

ABSTRACT OF THE DISCLOSURE p-(2-aminoethyl- or propyl)benzenesulfonamides, active in lowering blood pressure, prepared by reaction of aminoalkylbenzenes with chlorosulfonic acid and amination with ammonia, methylamine, or dimethylamine.

---

This invention relates to a method of lowering blood pressure in mammals and to compositions therefor. In particular, the invention relates to a method of lowering blood pressure in a mammal comprising administering to a mammal certain benzenesulfonamide compounds or salts thereof.

The compounds used in the method of the present invention are represented by the following structural formula:

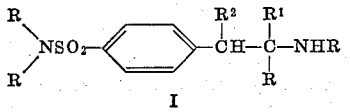

I wherein:

each R is hydrogen or methyl;
$R^1$ is hydrogen or methyl, or together with $R^2$ is methylene; and
$R^2$ is hydrogen or together with $R^1$ is methylene.

Also usable in the method of the invention are the pharmaceutically acceptable acid addition salts of the compounds of Formula I. Included among these salts are the hydrochloride, hydrobromide, sulfate, nitrate, maleate, tartrate, acetate, benzoate, phosphate, and ethanedisulfonate.

The compounds to be used in the method of the invention are either disclosed in the literature or are prepared by methods known or described herein. p-(2-aminoethyl)benzenesulfonamide is described in J. Am. Chem. Soc. 62, 2099 (1940); p-(2-aminopropyl)benzenesulfonamide and p-(2-aminopropyl)-N,N-dimethylbenzenesulfonamide are described in J. Med. Chem. 6, 519 (1963). They and other compounds within the scope of Formula I are preparable by starting with the readily available phenylalkylamine II, protecting the amino group by acetylation, treating the acetylated compound III with chlorosulfonic acid, aminating the resulting sulfonyl chloride IV with ammonia, methylamine, or dimethylamine to give an amido sulfonamide V, and hydrolyzing the acetyl group with acid or base to give the amino sulfonamide I. The products are isolated as their hydrochloride salts if hydrochloric acid has been the hydrolytic agent, or the salts are prepared by combining the basic product with a pharmaceutically acceptable acid according to conventional practice.

The compounds of Formula I have been found to have important activity in lowering blood pressure in mammals. When administered orally to unanesthetized metacorticoid hyperstensive rats in daily doses of 80 mg./kg., they lowered blood pressure from 10 to over 30 mm. Hg for up to 5 days. Particularly active are p-(2-aminopropyl)benzenesulfonamide,
p-(2-aminoethyl)benzenesulfonamide,
p-(2-methylaminoethyl)benzenesulfonamide,
p-(2-aminocyclopropyl)benzenesulfonamide,
p-(2-methylaminopropyl)benzenesulfonamide,
p-(2-aminopropyl)-N-methylbenzenesulfonamide,
p-(2-aminopropyl)-N,N-dimethylbenzenesulfonamide, and
p-(2-amino-2-methylpropyl)benzenesulfonamide.

The preferred compound for purposes of the present invention is dl - p - (2-aminopropyl)benzenesulfonamide. This compound has also been found to effectively lower blood pressure in neurogenic hypertensive dogs when administered in daily oral doses of 20 mg./kg. In mice its $LD_{50}$ has been determined to be 1872 mg./kg. subcutaneously and 5616 mg./kg. orally, and in rats greater than 3276 mg./kg. subcutaneously and 3990 mg./kg. orally.

The compounds of Formula I are formulated for use as hypotensive agents by combining them with standard pharmaceutical excipients according to conventional methods in order to prepare dosage units such as tablets, capsules, or injectables. In a tablet, the active component or salt thereof is generally incorporated into a solid carrier. Among the acceptable solid carriers are lactose, sucrose, magnesium stearate, stearic acid, starch, terra alba, talc, calcium phosphate, gelatin, agar, pectin, and acacia. A capsule may be prepared by placing the active component or salt, either alone or incorporated into a solid carrier, in a hard gelatin capsule. A time-delay material such as glyceryl monostearate or distearate, alone or with a wax, may also be included. An injectable formulation may consist of a solution of the active component or salt in saline solution, purified water, or sugar solution, possibly with preservatives such as parabens added. The compositions thus prepared are administered orally or parenterally in doses of 50–500 mg.

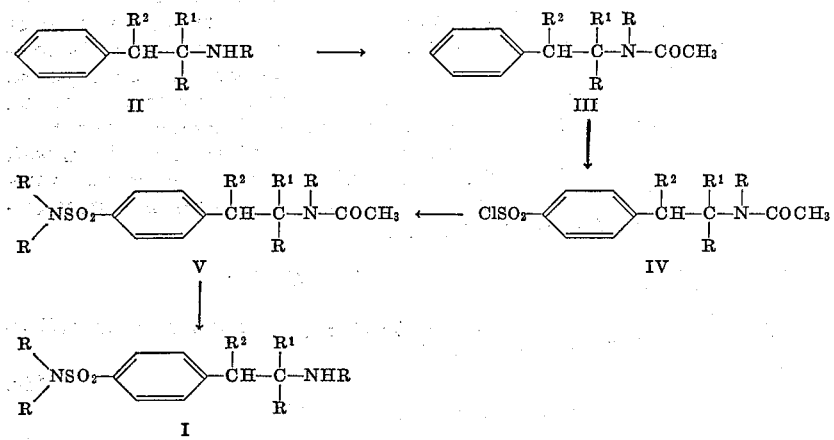

preferably 250–400 mg., 1 to 4 times daily. The optimum dosage will be determined on an individual basis taking into consideration the weight of the recipient, degree of hypotensive effect desired, and other pertinent factors.

Certain of the compounds within the scope of Formula I possess asymmetric carbon atoms and thus can exist as racemic mixtures or as optically active $d$ and $l$ compounds. Since it has been found that hypotensive activity is possessed by both racemic and optically active forms, it is intended that the present invention be construed to include any of the possible racemic or optically active forms. The various optically active forms of the compounds are obtained preferably by using the appropriate optical isomer as starting material, or else by separating according to conventional techniques the racemic mixtures.

The following examples are intended to illustrate the preparation of the compounds and compositions used in the invention, but are not to be construed as limiting the scope thereof.

EXAMPLE 1 p-(2-aminopropyl)-N-methylbenzenesulfonamide

A carefully prepared mixture of 100 ml. of acetic anhydride and 25 g. of α-methylphenethylamine is heated on the steam bath for 1–3 hours and the excess acetic anhydride evaporated. The residue of N-acetyl-α-methylphenethylamine is crystallized from aqueous alcohol or ether and melts at 92–93°.

The above amide (20 g.) is added with stirring in several portions to a 10-fold excess by weight of chlorosulfonic acid, cooled in a dry ice-acetone bath. After the addition is complete, the reaction mixture is allowed to stand overnight at room temperature and then poured into a large excess of ice. The mixture is allowed to stand for several hours and the supernatant liquid decanted from the residual sulfonyl chloride. A 40% aqueous methylamine solution is then added, the mixture is then heated on the steam bath for about 15 minutes and cooled. The resulting oily p-(2-acetamidopropyl)-N-methylbenzenesulfonamide is crystallized with n-butanol-ether and melts at 95–97°.

A suspension of 10 g. of the above sulfonamide in 100 ml. of conc. HCl-water (1:3) is refluxed for about 12 hours, cooled, filtered if needed and evaporated. Benzene (10 ml.) is added and evaporated off. The residual hydrochloride salt of the title product is crystallized from ethanol-ether and melts at 191–193°.

EXAMPLE 2 p-(2-amino-2-methylpropyl)benzenesulfonamide

α,α-Dimethylphenethylamine is acetylated with acetic anhydride as described in Example 1 to give N-acetyl-α,α-dimethylphenethylamine, purified by sublimation, M.P. 91–93°.

This amide is allowed to react with chlorosulfonic acid according to the procedure of Example 1 and the resulting sulfonyl chloride treated with aqueous ammonia in place of methylamine as described therein to give p-(2-acetoamido - 2 - methylpropyl)benzenesulfonamide, recrystallized from ethanol-hexane, M.P. 222–223°.

A solution of 9.6 g. of the above sulfonamide in 100 ml. of 10% NaOH is refluxed for 18 hours, cooled, and acidified with concentrated HCl. The mixture is filtered and the filtrate evaporated to dryness in vacuo. The residue is extracted with hot ethanol, the extracts concentrated to a small volume, and ether added until no more salt precipitates. Filtration gives the hydrochloride salt of the title product, recrystallized from ethanol-ether, M.P. 255–257°.

EXAMPLE 3 p-(2-methylaminopropyl)benzenesulfonamide $d$-N-α-dimethylphenethylamine is acetylated with acetic anhydride as described in Example 1 to give $d$-N-acetyl-N-α-dimethylphenethylamine.

This amide is allowed to react with chlorosulfonic acid according to the procedure of Example 1 and the resulting sulfonyl chloride treated with aqueous ammonia in place of methylamine as described therein to give $d$-p-(2-N - methylacetamidopropyl)benzenesulfonamide, recrystallized from acetone-hexane, M.P. 83–85°.

This sulfonamide (10 g.) is hydrolyzed with 10% NaOH as described in Example 2. The hydrochloride salt of the title product is recrystallized from ethanol-ether and decomposes at 232°.

The $dl$-product is obtained in the same manner by preparing the acetamide, treating with chlorosulfonic acid and then ammonia to obtain the amido sulfonamide, M.P. 165–166° (from ethanol), and hydrolyzing the acetyl group to give the hydrochloride salt of the $dl$-product, M.P. 194–186° (from ethanol).

EXAMPLE 4 p-(2-methylaminoethyl)benzeneulfonamide

N-methylphenethylamine is acetylated with acetic anhydride as described in Example 1 to give N-acetyl-N-methylphenethylamine.

This amide is allowed to react with chlorosulfonic acid according to the procedure of Example 1 and the resulting sulfonyl chloride treated with aqueous ammonia in place of methylamine as described therein to give p-(2-N-methylacetamidoethyl)benzenesulfonamide, M.P. 82–85° (from ethyl acetate).

This sulfonamide (25 g.) is refluxed overnight with 200 ml. of 1:1 concentrated HCl-water and evaporated in vacuo. The residue is triturated with ethanol and filtered, and the recovered hydrochloride recrystallized from ethanol or methanol-ether, M.P. 228–230°.

EXAMPLE 5 p-(2-aminocyclopropyl)benzenesulfonamide

To a stirred suspension of 100 g. of trans - 2-phenylcyclopropylamine sulfate in 250 ml. of water is added 120 g. of acetic anhydride. When all the solid has dissolved, a solution of 111 g. of sodium acetate trihydrate in 250 ml. of water is added. The solution is allowed to stand overnight and is extracted with methylene chloride. The extracts are dried and evaporated to give trans-N-acetyl-2-phenylcyclopropylamine, M.P. 90–91° (from benzene-hexane).

To 20 g. of this amide in a Dry-Ice-acetone bath is added 200 ml. of chlorosulfonic acid. The mixture is kept at room temperature overnight, poured into 2 l. of ice, filtered or decanted, and the residue treated with aqueous ammonia and heated briefly on the steam bath. The mixture is filtered and allowed to cool, and the separated trans - p - (2 - acetamidocyclopropyl)benzenesulfonamide. M.P. 175–176° (from ethanol-cyclohexane) obtained.

This sulfonamide (4 g.) is refluxed for 2 hours with 40 ml. of 10% HCl and evaporated. The residual hydrochloride of the title product is recrystallized from ethanol, M.P. 214–215°.

EXAMPLE 6

A capsule for lowering blood pressure has the following components:

Mg.

p-(2-aminopropyl)benzenesulfonamide
  hydrochloride _____ 300
Lactose, starch, or terra alba _____ 300

A tablet for lowering blood pressure has the following components:

| | Mg. |
|---|---|
| p-(2-aminopropyl)benzenesulfonamide hydrochloride | 250 |
| Magnesium stearate | 2.5 |
| Starch | 15 |
| Terra alba | 150 |
| Granulate with syrup or 5% gelatin solution terra alba q.s. ad | 450 |

I claim:

1. A method of lowering blood pressure in a mammal requiring such treatment comprising administering to said mammal an effective amount of a compound of the formula:

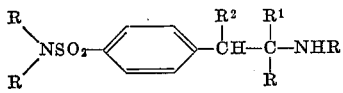

wherein:
each R is hydrogen or methyl;
$R^1$ is hydrogen or methyl; and
$R^2$ is hydrogen,
or a pharmaceutically acceptable acid addition salt thereof.

2. A method as claimed in claim 1, where the compound is administered orally.

3. A method as claimed in claim 2, where the compound is p-(2-aminopropyl)benzenesulfonamide or a pharmaceutically acceptable acid addition salt thereof.

4. A method as claimed in claim 3, where the compound is administered in a dose of 50–500 mg.

5. A method as claimed in claim 2, where the compound is p-(2-aminoethyl)benzenesulfonamide or a pharmaceutically acceptable acid addition salt thereof.

6. A method as claimed in claim 2, where the compound is p-(2-methylaminoethyl)benzenesulfonamide or a pharmaceutically acceptable acid addition salt thereof.

7. A method as claimed in claim 2, where the compound is p-(2 - methylaminopropyl)benzenesulfonamide or a pharmaceutically acceptable acid addition salt thereof.

8. A method as claimed in claim 2, where the compound is p-(2-aminopropyl) - N - methylbenzenesulfonamide or a pharmaceutically acceptable acid addition salt thereof.

9. A method as claimed in claim 2, where the compound is p-(2 - aminopropyl) - N,N - dimethylbenzenesulfonamide or a pharmaceutically acceptable acid addition salt thereof.

10. A method as claimed in claim 2, where the compound is p-(2-amino-2-methylpropyl)benzenesulfonamide or a pharmaceutically acceptable acid addition salt thereof.

11. A tablet or capsule for lowering blood pressure comprising 50–500 mg. of p-(2-aminopropyl)benzenesulfonamide or a pharmaceutically acceptable acid addition salt thereof and a pharmaceutical carrier therefor.

12. A tablet or capsule as claimed in claim 11, where the amount of p-(2-aminopropyl)benzenesulfonamide is 250–400 mg.

References Cited

Miller et al., J. Am. Chem. Soc. 62, pp. 2099–2103 (1940).

Holland et al., J. Med. Chem. 6, pp. 519–524 (1963).

ALBERT T. MEYERS, Primary Examiner

S. J. FRIEDMAN, Assistant Examiner